United States Patent

[11] 3,626,227

[72] Inventor Irving R. Ritsema
 South Bend, Ind.
[21] Appl. No. 42,181
[22] Filed June 1, 1970
[45] Patented Dec. 7, 1971
[73] Assignee The Bendix Corporation

[54] WHEEL SPEED SENSOR FOR AN ADAPTIVE BRAKING SYSTEM
 9 Claims, 6 Drawing Figs.
[52] U.S. Cl. .................................................. 310/168, 310/90
[51] Int. Cl. ............................................. H02k 17/42
[50] Field of Search ............................................. 310/79–82, 168–171, 112, 114, 90, 120, 121; 73/529; 74/11–13; 324/174; 179/100.2 T; 295/36, 43; 102/61, 217, 118, 215 C; 108/55; 317/5; 303/20, 21

[56] References Cited
UNITED STATES PATENTS
| | | | |
|---|---|---|---|
| 3,447,838 | 6/1969 | Haviland | 74/13 |
| 1,797,579 | 3/1931 | Hoffman | 74/12 |
| 3,469,135 | 9/1969 | Haviland | 310/170 |
| 3,509,395 | 4/1970 | Schrecongost | 310/168 |
| Re. 22,549 | 9/1944 | Plensler | 310/82 |
| 3,198,973 | 8/1965 | Short | 310/168 |
| 3,482,130 | 12/1969 | Woodward | 310/168 |
| 3,541,368 | 11/1970 | Jones | 310/168 |
| 3,515,920 | 6/1970 | Jones | 310/168 |

Primary Examiner—D. X. Sliney
Assistant Examiner—R. Skudy
Attorneys—William N. Antonis and Plante, Hartz, Smith and Thompson ABSTRACT: The tone wheel and the electromagnetic pickup are mounted with a running clearance less than the known deflections which occur during severe braking. Both elements are provided with smooth abrasion resistant bearing surfaces and the pickup is spring mounted so that no damage results during the occasional brief rubbing contacts. The projecting elements of the pole piece of the pickup are covered to a predetermined depth by the bearing material so that a minimum clearance is maintained during the periods of contact.

PATENTED DEC 7 1971

INVENTOR.
IRVING R. RITSEMA
BY
Planté, Hartz, Smith & Thompson
ATTORNEYS

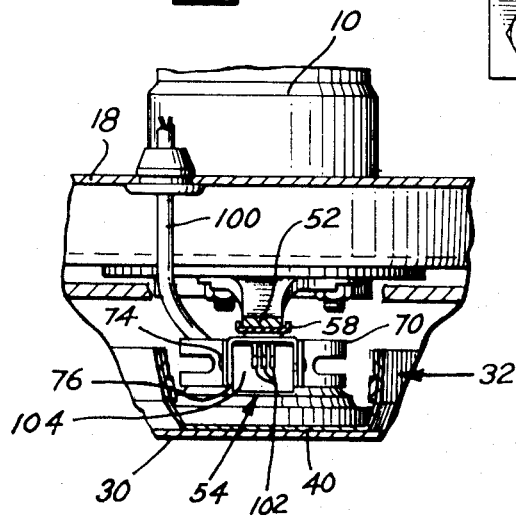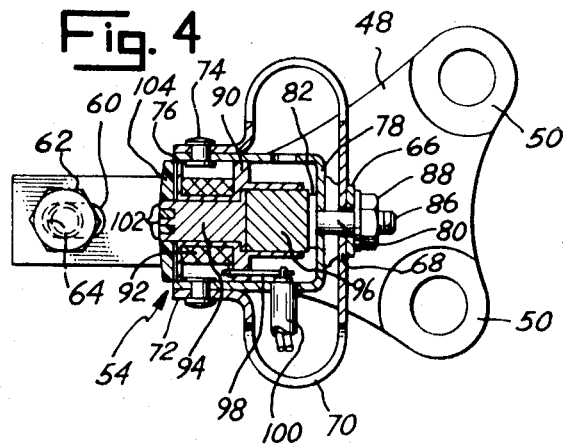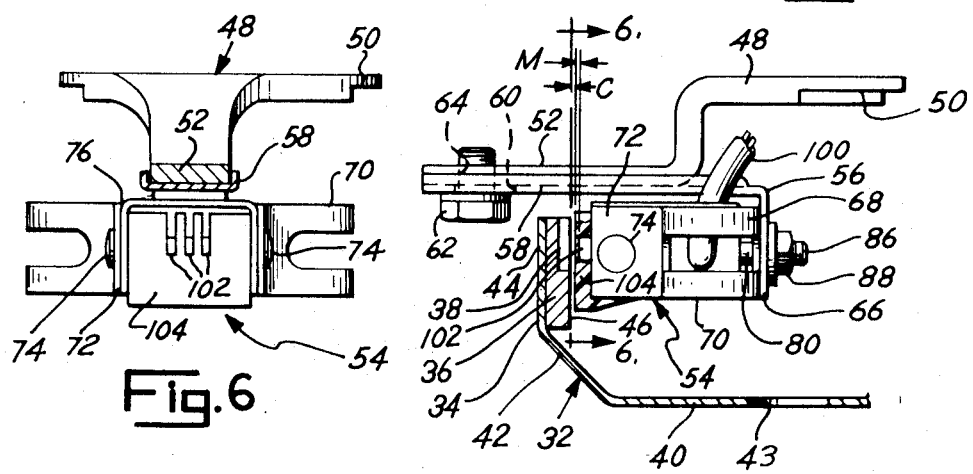

3,626,227

WHEEL SPEED SENSOR FOR AN ADAPTIVE BRAKING SYSTEM

SUMMARY OF THE INVENTION

This invention relates to an adaptive braking system for use on an automotive vehicle. More specifically, it relates to the wheel speed sensor which provides the adaptive braking system with information relative to the speed and acceleration of one of the several wheels of an automotive vehicle. An adaptive braking system of the type in which the invention would be used is illustrated in U.S. Pat. No. 3,494,671. Wheel speed sensors of the same general class and of which this is an improvement are described in U.S. Application Nos. 42396, filed on June 1, 1970, 42397, filed on June 1, 1970, also having in common with this application the same assignee.

Since the beginning of adaptive braking development in automotive vehicles, the "frictionless" wheel speed sensor, in which a pickup is mounted on the axle supporting structure with a predetermined clearance from a tone wheel or signal generating element mounted upon the wheel or its axle, has been considered the ideal solution to the problem. These devices have not been completely satisfactory because the inherent flexibility of conventional vehicle axle parts permits rather large relative deflections. These deflections frequently are a maximum at times of severe braking, which are also the times when the best performance of the wheel speed sensor is required. Therefore, it is an object of this invention to provide a wheel speed sensor that functions satisfactorily in spite of the normal deflections of conventional vehicle structures.

One method by which it has been attempted to provide a satisfactory "frictionless" sensor has been to make the initial clearance large enough so that when the parts deflect toward each other, they do not come into contact. However, there are other conditions which cause deflections of the sensor parts away from each other and frequently this has caused such a great increase in clearance that the signal is completely lost. Thus, it is also an object of the invention to provide a sensor in which the initial clearance is small enough so that increases in clearance due to normal deflections do not destroy the signal.

In conventional approaches to the "frictionless" sensor, if the sensor parts came into contact with each other, serious damage would result, frequently rendering the sensor inoperative. It is a further object of the invention to provide a wheel speed sensor so constructed that the parts can come into contact without damage and operate normally while in contact for brief periods of time.

To accomplish these objects, the invention provides a sensor in which the pickup is spring mounted and has its pole piece embedded in or surrounded by a nonmagnetic bearing material to a predetermined depth to establish a certain minimum clearance, and in which the tone wheel presents a smooth unbroken surface for contact with the pickup during periods of high deflection.

While these problems have been most severe in rear wheel applications, this invention is readily applied to both front and rear wheels. However, for the sake of simplicity, only a rear wheel application is illustrated and described in the following detailed specification.

BRIEF DESCRIPTION OF THE DRAWINGS

FIG. 3 is a partial sectional view taken along the line 3—3 of FIG. 2.

FIG. 4 is an elevational view of the magnetic pickup and its mounting arrangement with the pickup partially sectioned.

FIG. 5 is a side view of FIG. 4 including a sectional portion of the tone wheel.

FIG. 6 is a sectional view taken on line 6—6 of FIG. 5.

DETAILED DESCRIPTION OF THE INVENTION

Figure 1:
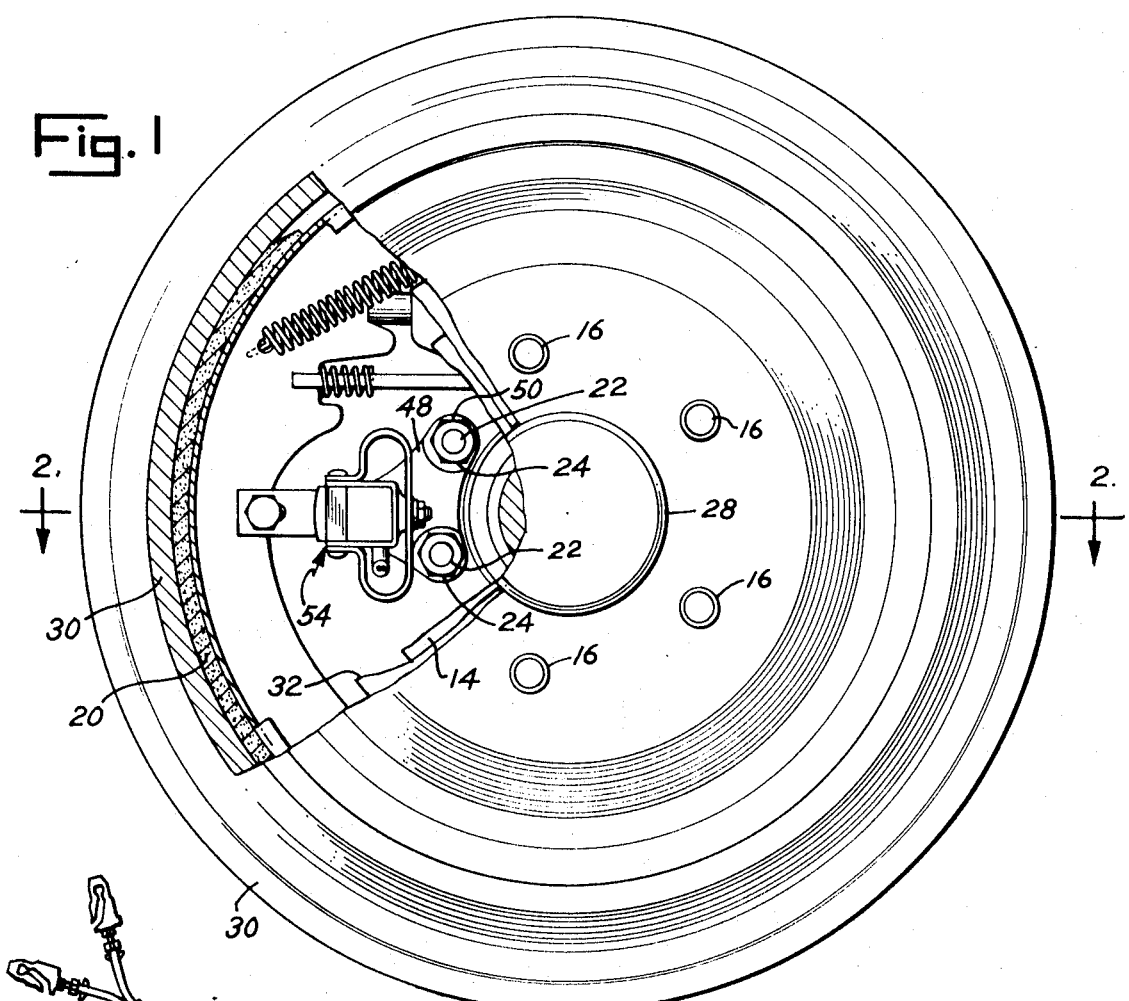
FIG. 1 is an elevational view looking at the end of an automobile rear axle assembly with the wheel, brake drum and axle flange partially cut away.
Figure 2:
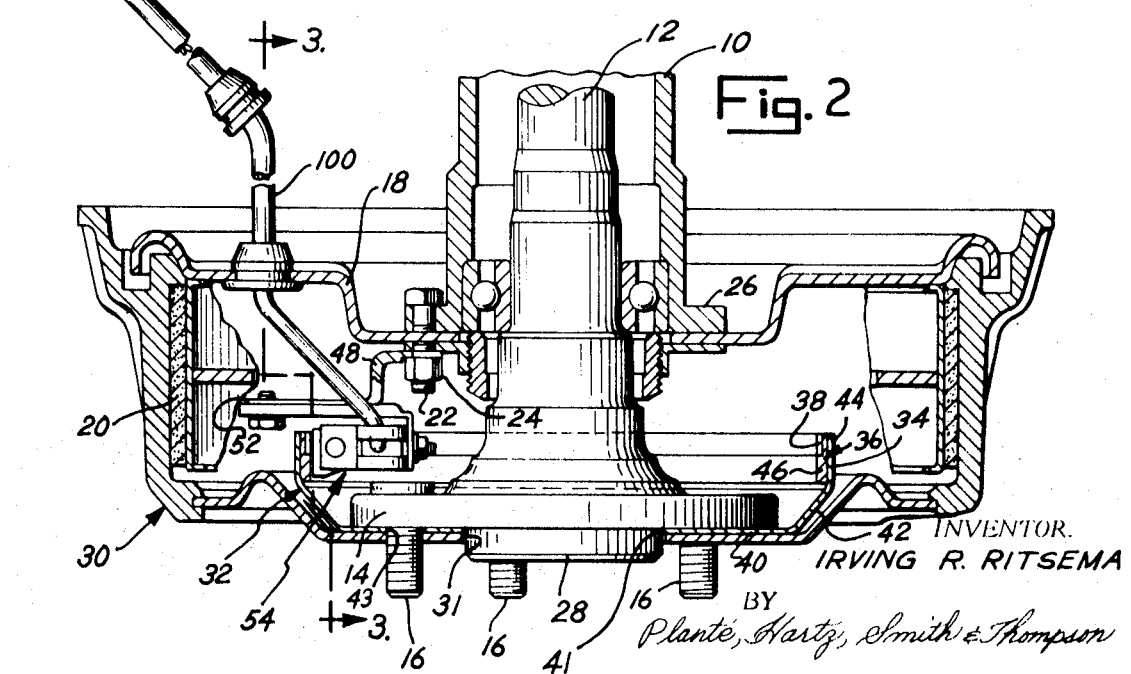
FIG. 2 is a sectional view taken generally along the line 2—2 of FIG. 1.

FIGS. 1, 2 and 3 show a conventional automotive vehicle wheel supporting structure including a rear axle housing 10 containing an axle 12 formed with a flange 14 into which are pressed the usual wheel mounting bolts 16. A brake backing plate 18 to which are attached the usual parts of a brake such as the shoes 20 is mounted by bolts 22 and nuts 24 to a flange 26 of the axle housing 10. The outer face of the axle flange 14 is formed with a pilot projection 28 which usually is made accurately concentric with the bearing surfaces of the axle 12. The central bore 31 of a brake drum 30 pilots on the projection 28 and the drum 30 is held in place by being clamped between the wheel (not shown) and the axle flange 14.

To carry out the invention there is provided a tone wheel assembly 32 which consists of a large diameter cup-shaped stamping 34 and a rather massive cross section ring 36 of ferromagnetic material formed on its inner surface with teeth 38 similar to internal gear teeth. The cup-shaped stamping 34 is formed with a flat bottom 40 having a large central opening 41 which fits closely on the pilot projection 28 of the axle flange 14, and an offset portion 42 of generally cylindrical or conical form terminating at its inner margin in a cylindrical flange 44 into which the ring 36 is pressed. The bottom 40 of the cup-shaped stamping 34 is also pierced by a series of holes 43 to enable it to pass over the wheel mounting bolts 16 into contact with the axle flange 14. The ring 36 may be fabricated by rolling a heavy strip of ferromagnetic material such as steel into a ring, welding the ends together, machining the ring to provide needed dimensional accuracy and forming the teeth 38 by a shaping or slotting process. As shown in the figures, the ring is of rectangular cross section and the teeth 38 are formed on about one half of the inner surface. The remaining half of this surface presents a smooth unbroken abrasion resistant bearing surface 46. The particular method of fabricating the ring 36 and forming the teeth, and the shape of the ring and its means of attachment to the cup-shaped mounting element are not material to the invention as long as the ring 36 produced has the smooth unbroken bearing surface 46 at or near the teeth 38.

To carry out the invention further, there is provided a bracket 48 having foot portion 50 adapted to be secured under the nuts 24 of at least two of the brake mounting bolts 22, and an arm 52 extending radially outward adjacent to the tone wheel 32 somewhat beyond the circumference thereof. (Greater detail may be seen in FIGS. 4, 5 or 6.) An electromagnetic pickup assembly 54 is adjustably secured to the arm 52 of the bracket 48 by means of an L-shaped sub-bracket 56 having the long leg 58 of the L formed in a shallow U to fit three sides of the arm 52 and provide an adjustment slide. An elongated slot 60 in the leg 58 receives a clamp screw 62 which is threaded into a tapped hole 64 near the end of the arm 52. It should be noted that, due to the fact that the arm 52 extends beyond the circumference of the tone wheel assembly 32, with the wheel and brake drum 30 removed and with the tone wheel in place, the head of the screw 62 is readily accessible for the purpose of adjusting the relative positions of the pickup assembly 54 and the tone wheel 32. The shorter leg 66 of the L-shaped sub-bracket 56 extends into the cavity of the tone wheel 32 and the central portion 68 of a resilient element such as a C-shaped leaf spring 70 is attached to it by suitable means such as spot welding. The ends 72 of the C-shaped spring are attached by rivets 74 to the shell or housing 76 of the pickup 54. The bottom wall 78 of the housing 76 is provided with a threaded stud 80 having a head 82 which is welded to the inside surface. The threaded portion 86 of the stud 80 projects through a hole in the bottom wall 78 and also projects through holes in the central portion 68 of the C-shaped spring and the shorter leg 66 of the sub-bracket 56. A nut 88 threaded onto the stud 80 affords means of compressing the C-shaped spring to a predetermined load while leaving space between the bottom wall 78 of the housing of the pickup 76 and the central portion 68 of the spring 70. It will be seen that by means of the spring 70 and the stud 80, the pickup is supported and guided firmly in a predetermined relationship to the bracket 48 so that upon application of a force exceeding the preload of the spring 70, the pickup 54 will be displaced radially inwardly toward the center of the wheel.

While not forming a part of the invention per se, the pickup assembly 54 includes within the housing 76 a molded coil form 90 upon which a coil of fine wire 92 is wound. Also, the molded coil form 90 is formed with suitable recesses adapted to receive and hold a pole piece 94 and a permanent magnet 96 in their proper positions. Terminal fittings 98 connect the ends of the coil to lead wires 100 which are part of a wiring harness adapted to carry the signals generated by the sensor to the amplifier-computer of the adaptive braking system. One end of the pole piece 94 projects from the pickup assembly 54 into the proximity of the tone wheel 32 and is formed with three teeth 102 spaced equally to the teeth 38 of the tone wheel 32. A bearing structure 104 of nonmagnetic material such as a phenolic resin or an epoxy or a brake lining material is secured, by suitable means such as cementing, to the end of the pickup assembly 54. It will be observed that it closely surrounds the teeth 102 of the pole piece 94 and extends into an overlapping position with the smooth surface 46 adjacent to the teeth 38 of the tone wheel 32. It should also be noted that this bearing structure 104 projects beyond the tips of the teeth 102 by a short distance designated "M" in FIG. 5. "M" may be considered as standing for minimum clearance. Also, in the figures it will be seen that the bearing structure 104 is adjusted to a somewhat larger distance from the inner surface 46 of the tone wheel, this distance being designated by the letter "C" standing for normal clearance.

In operation, as the tone wheel 32 is rotated its teeth 38 are alternately aligned and not aligned with the teeth 102 of the pole piece 94 causing a variation of magnetic flux therein and inducing an alternating voltage in the pickup coil 92 which is transmitted via the wire leads 100 and the wiring harness to the computer of the adaptive braking system. When deflections occur during severe braking, the bearing structure 104 may come into contact with the smooth inner surface 46 of the tone wheel without causing any damage and, in fact, without causing appreciable wear because the pressure that can exist between the contacting elements is limited by the preload of the spring 70. Whenever deflections in excess of initial clearance "C" occur the pickup 54 merely moves radially inwardly further deflecting the spring 70. The position or attitude of the pickup 54 in relation to the tone wheel 32 is fully controlled by a combined action of the spring 70 and the stud 80. Since the initial clearance "C" can be made appreciably less than would be required if these special features of the invention were not a part of the structure, whenever deflections occur which tend to increase the clearance between the pickup 54 and tone wheel 70, the maximum clearance thus obtained does not weaken the signal sufficiently to adversely affect the operating effectiveness of the system.

We claim:

1. A wheel speed sensor for an automotive vehicle equipped with an adaptive braking system and having vehicle wheels and wheel supporting means, comprising:

a tone wheel;
 means for mounting the tone wheel on a vehicle wheel;
 pickup means connected to said wheel supporting means for generating a signal representative of the velocity of said vehicle; and
 means for mounting the pickup means in close proximity to said tone wheel;
 said mounting means including a resilient element,
 said resilient element being a leaf spring.

2. The wheel speed sensor of claim 1 in which the resilient element is a leaf spring constructed and arranged to act as a support and guide for the pickup means.

3. The wheel speed sensor of claim 2 in which said tone wheel has teeth and a bearing surface adjacent said teeth.

4. The wheel speed sensor of claim 3 in which said pickup means includes a pole piece with projecting teeth and bearing means surrounding said teeth and extending a predetermined distance beyond said teeth.

5. The wheel speed sensor of claim 1 in which the tone wheel has teeth and a bearing surface adjacent said teeth; and said pickup means includes a pole piece formed with projecting teeth and bearing means surrounding said teeth and extending a predetermined distance beyond said teeth.

6. The wheel speed sensor of claim 1 in which the pickup means includes:

a pole piece with projecting teeth; and
 bearing means surrounding said teeth and extending a predetermined distance beyond said teeth.

7. The wheel speed sensor of claim 5 wherein, during deflection of said wheel with respect to said wheel supporting means, said bearing means contacts said bearing surface to protect the teeth in said tone wheel and said pole piece of said pickup means, said protection of said bearing means and surface allowing said pickup means to be positioned in close proximity to said tone wheel without damage to said wheel speed sensor.

8. The wheel speed sensor of claim 4 wherein, during abnormally large deflections of said wheel with respect to said wheel supporting means, said bearing means contacts said bearing surface and pushes said pickup means inwardly against a counter force from said leaf spring thereby protecting the wheel speed sensor against damage and allowing a closely adjacent relationship between the teeth of said tone wheel and said pickup means which insures against the loss of signals to said adaptive braking system.

9. In a wheel speed sensor for an automotive vehicle equipped with an adaptive braking system and having vehicle wheels and wheel supporting means:

a tone wheel;
 means for mounting the tone wheel on a vehicle wheel;
 pickup means for generating a signal representative of the velocity of said vehicle; and
 a generally C-shaped resilient element carried by said wheel supporting means and presenting a pair of arms movable relative to said wheel supporting means, said arms defining an opening therebetween;
 said pickup being mounted within said opening and secured to each of said arms.

* * * * *